Dec. 1, 1959  R. R. LAWRENCE  2,915,289
COMBINED JAR AND SAFETY JOINT
Filed June 25, 1957  2 Sheets-Sheet 1
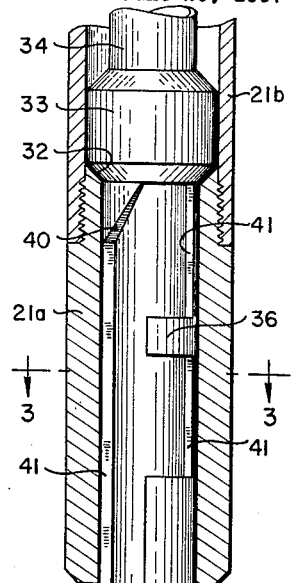
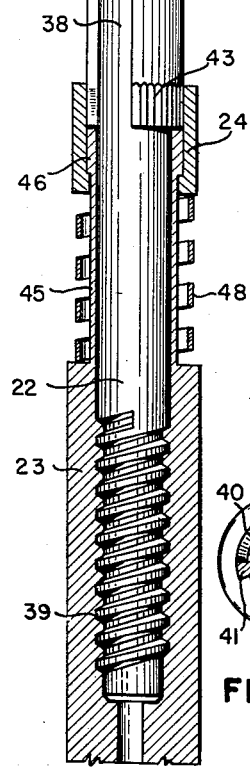
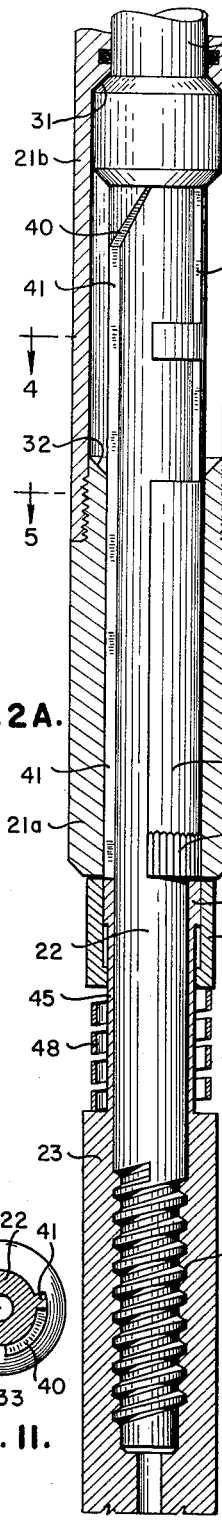
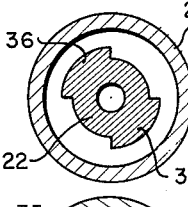
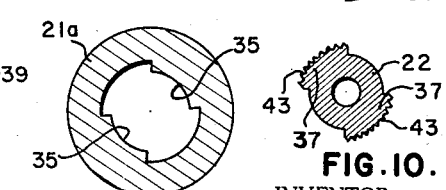
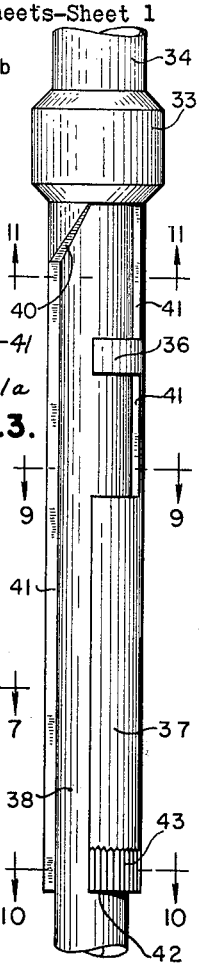
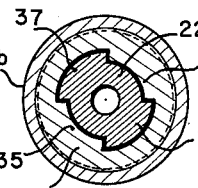
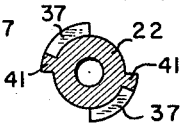
INVENTOR.
RICHARD R. LAWRENCE,
BY Earl Babcock
ATTORNEY.

Dec. 1, 1959   R. R. LAWRENCE   2,915,289
COMBINED JAR AND SAFETY JOINT
Filed June 25, 1957   2 Sheets-Sheet 2
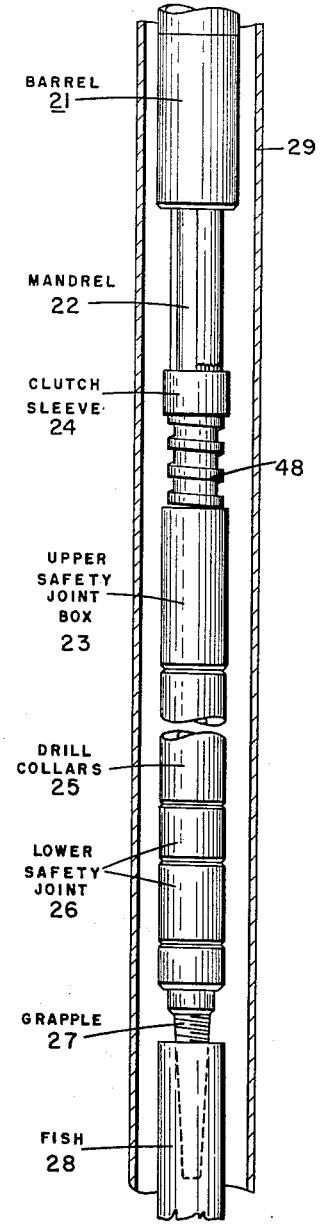
FIG. 1.
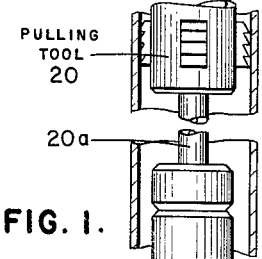
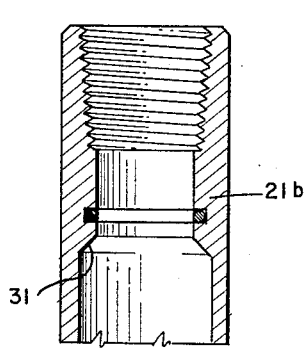
FIG. 16.
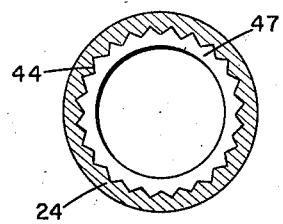
FIG. 15.
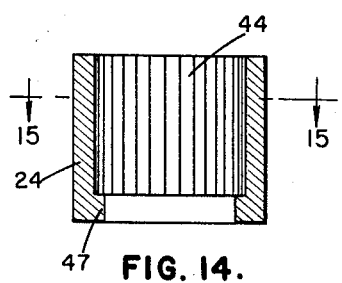
FIG. 14.
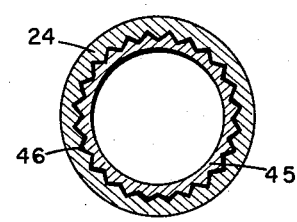
FIG. 13.
FIG. 12.
INVENTOR.
RICHARD R. LAWRENCE
BY Earl Babcock
ATTORNEY.

United States Patent Office 2,915,289
Patented Dec. 1, 1959

2,915,289

COMBINED JAR AND SAFETY JOINT

Richard R. Lawrence, Liberty, Tex.

Application June 25, 1957, Serial No. 667,751

1 Claim. (Cl. 255—27)

This invention relates to a combined jar and safety joint for use in oil wells or the like.

The present application is a continuation-in-part of the copending application of Richard R. Lawrence, Serial No. 349,431, filed April 17, 1953, now abandoned.

It frequently happens that objects become stuck in wells. Various fishing tools have been designed to remove them, these usually consisting of a grapple of some sort run into the well with other devices on an operating string such as drill pipe or tubing. Sometimes the stuck object cannot be moved after the grapple has been connected to it. To enable the fishing tools to be removed, even though the stuck object and the grapple cannot, fishing tools are ordinarily provided with safety joints. Jars have also commonly been employed to assist in dislodging a stuck object, or to "shuck" a grapple if that becomes necessary.

In the fishing tools heretofore provided, the incorporation of safety joints has interfered with certain operations. For example, if the safety joint consists of a threaded joint which unscrews simply by taking a left-hand torque in the operating string, its use necessarily prevents the placing of any considerable left-hand torque on any part of the apparatus below the safety joint.

All practical spears and overshots used as grapples in oil wells engage a stuck object by rotating the operating string to the left. Such a grapple can then be released from the object, if necessary, by rotating the operating string to the right, thus making it possible to release the grapple without danger of the drill pipe or tubing becoming unthreaded at some point way above the grapple.

Accordingly, it is apparent that if an ordinary safety joint is placed in a string of fishing tools above an ordinary grapple, great care must be exercised to avoid separation of the string at the safety joint prematurely. This is especially true if a jar is also incorporated in the fishing tools. If a straight pull does not dislodge a fish, sometimes it can be jarred loose. Accordingly, the operator may wish to "shuck" the grapple, that is, deliver hammer blows to it, either up or down, to jar it loose from the fish. Such jars often cause the safety joint to unscrew instead of causing the grapple to release.

The main object of the present invention is to provide a combined jar and safety joint which will permit heavy hammer blows to be delivered to a grapple when desired, while avoiding the possibility of accidental parting of the operating string at the safety joint.

One advantage resulting from the use of the invention is that two safety joints may be incorporated in the string with the assurance that, if desired, releasing torque can be exerted on the lower one without causing the upper one to unscrew by accident.

Other objects and advantages of the invention will be apparent from the following description, taken in connection with the accompanying drawings, in which:

Fig. 1 is a framentary view in side elevation of a string of fishing tools embodying the present invention, the assembly being illustrated as located in casing in a well and connected to an object to be fished out;

Fig. 2 is a view in side elevation, partially in cross-section of the jar and safety joint of the assembly of Fig. 1, the parts being in the position they occupy while pull is being exerted on the fish;

Fig. 2A is a view in side elevation of the same apparatus as that shown in Fig. 2, but illustrating the position of the parts when the jar is fully telescoped and in the position to permit the safety joint to be unscrewed;

Fig. 3 is a transverse cross-sectional view of the apparatus of Fig. 2, taken on the line 3—3 thereof;

Fig. 4 is a transverse cross-sectional view of the apparatus of Fig. 2A taken on the line 4—4 thereof;

Fig. 5 is a transverse cross-sectional view of the apparatus of Fig. 2A taken on the line 5—5 thereof;

Fig. 6 is a view in vertical cross-section of the lower section of the barrel used in the apparatus of Figs. 2 and 2A;

Fig. 7 is a transverse cross-sectional view of the section of the barrel of Fig. 6, being taken on the line 7—7 thereof;

Fig. 8 is a fragmentary view in side elevation of the mandrel used in the apparatus of Figs. 2 and 2A;

Fig. 9, Fig. 10, and Fig. 11 are transverse cross-sectional views of the mandrel of Fig. 8, being taken on the lines 9—9, 10—10 and 11—11 thereof, respectively;

Fig. 12 is a view in side elevation of the safety joint used in the apparatus of Figs. 2 and 2A, and showing the clutch sleeve associated with it in cross-section and with a portion of the pin of the mandrel removed;

Fig. 13 is a transverse cross-sectional view of the safety joint of Fig. 12, taken on the line 13—13 thereof;

Fig. 14 is a vertical cross-sectional view of the clutch sleeve used in the apparatus of Figs. 2 and 2A;

Fig. 15 is a transverse cross-sectional view of the clutch sleeve of Fig. 14, taken on the line 15—15 thereof; and Fig. 16 is a vertical cross-sectional view of the upper section of the barrel used in the apparatus of Figs. 2 and 2A.

Referring to the drawings in detail, and first to the general assembly of Fig. 1, it will be seen that the fishing tools there illustrated are adapted to be lowered into a well on an operating string of drill pipe or tubing (not shown). The assembly includes a pulling tool 20, the stem 20a of which is connected to a barrel 21. This pulling tool may be of the well-known type such as shown and described in Lawrence Patents 2,377,249 of May 29, 1945, and 2,537,413 of January 9, 1951. Telescoping within the barrel 21 is a mandrel 22. As explained hereinafter, the structure is such that the mandrel cannot be pulled completely out of the barrel and its rotation with respect to the barrel is limited, but it can be moved in and out of the barrel a certain amount if the angular position of it with respect to the barrel is correct.

The lower end of the mandrel 22 is provided with a pin 39 (see Fig. 2) which is threaded into the box 23 of an upper safety joint. Rotation of the mandrel with respect to the box 23 is normally prevented by the clutch sleeve 24.

The box 23 may be connected to drill collars 25, and they, in turn, may be connected to a box 26 of a lower safety joint integral with the grapple 27. A stuck object or "fish" which is to be removed from the well is more or less diagrammatically illustrated at 28.

The pulling tool 20 may be of the general type shown and described in the U.S. Patent to Lawrence No. 2,377,-249, and need not be described in detail here. It is so arranged as to exert a large lifting force on the stem 20a when subjected to hydraulic pressure, so that all the fishing tool equipment connected to the stem 20a is lifted.

The stem 20a, the barrel 21, the mandrel 22, the safety joints 23 and 26, the drill collars 25 and the grapple 27 should all have a conduit vertically therethrough so that fluid can be pumped from one end to the other. Preferably the conduits in the upper portion of the assembly, including the jar and safety joint which constitutes the present invention, should be large enough to permit an electric cable with an explosive thereon to be lowered through them so that a "string shot" may be employed to break a joint below.

The barrel 21 is illustrated in detail in Figs. 3 to 7 inclusive and 16. It is made of two parts to permit the mandrel 22 to be assembled with it. The lower section is designated 21a and the upper section 21b. These sections are threaded together as shown in Fig. 2A. The flanges at the upper ends of the two sections provide hammers 31 and 32 which act to deliver jar blows to the anvil 33 at the top of the mandrel 22 when the barrel is raised and lowered by the operating string as the mandrel remains stationary.

A wash pipe 34, a fragment of which is shown at the top of Figs. 2 and 2A, may be made integral with the mandrel 22 and extend up through the hammer 31. Packing may be provided, as illustrated, between the wash pipe 34 and the hammer 31. This prevents foreign matter from getting into the space between the hammer 31 and the anvil 33.

The lower section 21a of the barrel controls relative rotation between the barrel and the mandrel. To accomplish this, it is provided with spaced inwardly projecting lands 35. The inner surfaces of these lands 35 are curved cylindrically to conform to the cylindrical surface of the main body of the mandrel 22.

The mandrel 22 is provided with outwardly projecting lands 36 and 37, suitably spaced to allow the lands 35 of the barrel to move in between them, and with long, narrow, vertically extending lands 41 which will not permit the lands 35 to pass by them. Except for its lands, the mandrel 22 is cut away to provide grooves 38. The lands and grooves of the barrel 21 and mandrel 22 are conventional locking means for controlling telescoping movement between a mandrel and a barrel in oilfield tools. They constitute what is commonly called a J-slot connector. The lands 35 are inwardly projecting pins which fit in the grooves 38. The grooves 38 have the shape of an inverted letter J. When the pins 35 are in the upper horizontally offset jortions of the grooves 38, there can be only limited longitudinal movement between the mandrel 22 and the barrel 21 because then the lands 35 will strike the lands 36 and 37. When, however, the mandrel is rotated in the barrel 21 a slight amount, the lands 35 may be brought into the long longitudinally extending portions of the grooves 38, at which time the coupling serves only to limit relative rotation between the mandrel 22 and the barrel 21, the lands 35 and 41 then engaging. The lands 41 thus constitute loose splines for controlling relative rotation between the mandrel 22 and the barrel 21.

The mandrel 22 is shown in detail in Fig. 8, with various cross-sectional views illustrated in Figs. 9 to 11. Generally, it is of cylindrical shape and provided at the top with a head which serves as the anvil 33. At its lower end, the mandrel is provided with a threaded depending extension as shown at 39, Fig. 2, so that it can readily be screwed into the box 23 of the upper safety joint. The threads on the depending extension 39 are right-hand as illustrated, so that the mandrel unscrews from the box 23 when left hand torque is transmitted through the operating string, the barrel 21 and the mandrel 22 to the threads extension 39. Preferably, these are double threads, similar to "acme" threads, so that the joint can be coupled or uncoupled with the exertion of only small relative torque.

Referring to Fig. 8, it will be seen that the grooves 38 extend the entire length of the shank of the mandrel but are of different widths at different places along the shank. The upper surfaces of these grooves, just below the anvil 33, are shaped like a cam as shown at 40, Fig. 8, to cause the barrel 21 to rotate slightly when the lands 35 of the barrel strike these surfaces 40 as the barrel and mandrel are pulled into the fully extended position shown in Fig. 2.

When thus extended, the barrel and mandrel may be said to be locked against telescoping action, although there is enough play between the interlocking parts to permit longitudinal movement of a few inches. However, unless the barrel is turned slightly in a clockwise direction, as viewed from above, as it is set down, the lands 35 of the barrel strike the lands 36 and 37 of the mandrel so that the relative longitudinal travel is definitely limited to this small amount of play.

All that is necessary in order to bring the barrel 21 and mandrel 22 into the position where the barrel 21 can fully telescope upon the mandrel to take the position shown in Fig. 2A is to take a slight right-hand torque in the operating string as it is set down, so that the lands 35 are moved over into the longitudinally extending portions of the grooves 38.

The grooves 38 are quite wide on the upper portion of the shank of the mandrel 22, the metal being cut away nearly 180 degrees, leaving only the splines 41 as shown in Figs. 9 and 11. Opposite the lands 36 and 37, the grooves 38 are, of course, not so wide, but still wide enough to permit the lands 35 of the barrel to pass, as shown in Figs. 4 and 5. When the barrel 21 and mandrel 22 are in the position shown in Fig. 2A, there can be practically no relative rotation between the barrel and the mandrel. When the barrel 21 and mandrel 22 are in the position shown in Fig. 2, there can be relative rotation between the barrel and mandrel of nearly 90 degrees—enough for the lands 35 to clear the lands 36 and 37—provided the barrel is set down as it is being rotated so that the cam surfaces 40 do not act upon the lands 35. After this slight relative rotation, however, the splines 41 engage the lands 35 and cause them to travel into the lower portions of the grooves 38 in between the lands 37.

The lands on the mandrel 22 terminate some distance above the threads 39, so as to provide a shoulder 42 as best seen in Fig. 8. For some short distance above this shoulder, the lands 37 are feathered or ribbed as shown at 43 to provide a clutch face for cooperation with the clutch sleeve 24.

As shown in Fig. 14, the inner face of the clutch sleeve 24 is also feathered or ribbed as shown at 44. Hence, when this sleeve 24 extends over the lower ends of the lands 37 of the mandrel 22, as shown in Fig. 2, there can be no relative movement between the mandrel and the sleeve.

However, if the sleeve 24 is pushed down off of the lands 37, then the ribs 43 and 44 no longer interlock and the sleeve 24 can then rotate with respect to the mandrel 22. This condition exists when the barrel 21 and mandrel 22 are fully telescoped together as shown in Fig. 2A.

The box 23 of the upper safety joint is provided with an upwardly extending tubular stem 45 which has an outwardly projecting flange 46. In actual practice, this stem is a separate piece which is threaded into the box 23, but for purposes of illustration it is shown integral with the box 23.

The outer surface of the flange 46 is ribbed to interlock with the ribs 44 on the inner surface of the clutch sleeve 24 at all times. The clutch sleeve has an inwardly extending flange 47 (Fig. 14) which slides along the stem 45 beneath the flange 46. A coil spring 48 is placed on the stem 45 and urges the sleeve 24 upwardly at all times, the lower end of this spring resting on the top of the box 23.

The apparatus of Figs. 2 and 2A may be used in an ordinary fishing string without a pulling tool like that shown at 20 in Fig. 1 and without the lower safety joint 26 being present. The barrel 21 is then connected directly to the drill pipe or tubing and the box 23 connected directly to the grapple 27 (see the description in the specification of the copending application Serial No. 349,341 mentioned above). Other uses will readily suggest themselves to those skilled in the art.

The particular assembly of Fig. 1 has some advantages over anything heretofore employed in fishing tools, however, and that assembly will now be described as illustrating the preferred use.

With the barrel 21 and mandrel 22 in the position shown in Fig. 2, the assembly of Fig. 1 may be lowered into a well until the grapple 27 engages the fish 28. Insofar as the apparatus shown in Fig. 2 is concerned, torque can be transmitted to the parts below either to the left or to the right to cause the grapple to engage the fish, and in some assemblies the lower safety joint 26 will be left out of the string. If the joint 26 is used care will have to be exercised to prevent it from unscrewing as the grapple is rotated to the left to set it.

Of course, if everything goes well, after the grapple engages the fish, the assembly of Fig. 1 may remove it from the well without the jar or either safety joint being used.

Anything can happen in a well, however. Assume that the normal operations of the pulling tool have been carried out but that nothing has moved.

Under such circumstances, normally the first thing that the operator wants to know is whether the pulling tool itself is hung up in the well. This can be determined with the apparatus of the present invention by merely lowering the operating string and watching the weight indicator on the elevators to see if the barrel 21 is moving down on the mandrel. If it is, the change in weight will occur after the operating string has moved the length of the stroke of the mandrel 22 in the barrel 21, whereas if the pulling tool 20 is stuck, the change in weight will appear as soon as the operating string is lowered at all. During this test, the operating string should be subjected to a slight right-hand torque to bring the lands 35 into the grooves 38.

If the pulling tool is stuck, circulation can be reversed in the well or other steps taken to free it. Assume, however, that the pulling tool itself is not stuck. The operator may then wish to jar the fish or "shuck" the grapple. This is done by delivering hammer blows to the grapple. A slight right-hand torque is taken on the operating string as it is raised and lowered. As explained above, a right-hand torque enables the lands 35 in the barrel 21 to slide freely throughout the entire length of the grooves 38 of the mandrel 22, so that the hammers 31 and 32 may strike the anvil 33, these blows being delivered as the parts alternately take the positions of Figs. 2 and 2A.

During the jarring action, as the parts fully telescope together as shown in Fig. 2A, of course the clutch sleeve 24 temporarily disengages from the mandrel 22, but since there is right-hand torque in the string the threads 39 are held in the box 23.

During the jarring action the right-hand torque is also transmitted on down to the lower safety joint 26, if it is present in the string, so that there is no danger of it coming unscrewed at this time.

If the grapple and fish are still stuck after the jarring action has taken place, the operator may then wish to unscrew the lower safety joint 26 so that most of the string, including the drill collars 25, can be retrieved. To attempt this, the operating string is lifted to bring the parts into the position shown in Fig. 2 and a left-hand torque is applied to it. If this torque does not unscrew the joint 26 a "string shot" as mentioned above may be lowered into the joint 26 and shot off to assist in breaking it loose as the left-hand torque is applied to it. Since the threads of the safety joint 26 have to transmit the left-hand torque to the grapple as the grapple is being set, they cannot be designed to unscrew as easily as the threads 39 in the upper safety joint box 23, but the presence of this lower safety joint in the string may permit the drill collars to be retrieved.

Assuming that all of the above expedients have failed to release the operating string from the fish, the operator may then unscrew the upper safety joint. A slight right-hand torque is taken on the string as it is lowered to bring the parts into the position of Fig. 2A, so that the clutch sleeve 24 is pushed down off of the lands 37. A left-hand torque is then applied to the string so that the threads 39 back out of the box 23.

In bringing a fish out of a well, it has a tendency to rotate. This sometimes causes a conventional safety joint to unscrew and the fish and grapple fall back into the well. With the present invention, this cannot happen in the box 23 because the jar is in the position shown in Fig. 2 as the fish comes out of the well with the sleeve 24 locking the joint 23.

While only one embodiment of the invention has been shown and described herein, those skilled in the art will readily understand that various changes may be made in the structure, and that it may be operated differently than described above.

For example, the barrel need not necessarily have two hammers. Sometimes a jar in only one direction is required.

Also, while the apparatus is particularly designed to transmit torque from the operating string to the grapple while jarring blows are being delivered to the anvil, it is not necessary for even a small torque to be applied while jarring, provided only that the stroke of the jar blow is kept short so as to prevent the lands 35 of the barrel from striking the cam surfaces 40 of the mandrel.

In order to avoid any misunderstanding, although this fact is well known to all drillers, it is also pointed out that drill pipe and tubing have a high modulus of elasticity. Accordingly, an upward blow on the anvil of the mandrel 22 can be delivered by setting up a sort of wave motion in the operating string to cause a rebound at the lower end, the movement of the lower free end being something like that of a weight suspended on a rubber band.

While only one embodiment of the invention has been shown and described herein, it is obvious that various changes may be made without departing from the spirit of the invention or the scope of the annexed claim.

I claim:

Apparatus for use with a grapple on an operating string in a well, said apparatus consisting of two elements, a barrel and a mandrel, said mandrel being of smaller diameter than said barrel and projecting into said barrel so as to provide for relative telescoping movement therebetween, said elements also having loose interlocking splines for limiting relative rotation therebetween, means coacting with said barrel and said mandrel for locking the same against telescoping movement except when right-hand torque is exerted on the elements by the operating string, said barrel having a hammer affixed thereto and also having means for suspending the barrel on the operating string, said mandrel having an anvil affixed thereto and adapted to receive jarring blows from said hammer and also having a coupling arrangement for connecting said mandrel to a grapple, said coupling arrangement consisting of a threaded depending extension on the mandrel and a box threaded on the extension and adapted to be connected to the grapple, the threads on said extension and box being right-handed and adapted for easy separation upon left-hand torque being applied to the barrel and mandrel by the operating string, and a clutch between said extension and said box consisting of a sleeve slidable thereon and a spring for urging the sleeve upwardly to lock the mandrel and box together and prevent separation of the extension and box when the said mandrel is not fully telescoped into said barrel, said barrel having an abutment on its lower end adapted to depress said sleeve when said mandrel and said barrel are fully telescoped together to thereby release said coupling arrangement and permit separation of the extension and box, whereby it is necessary, when said mandrel and said barrel are in extended position to rotate the operating string to the right, then set it down, and then rotate it to the left to uncouple said coupling arrangement.

References Cited in the file of this patent

UNITED STATES PATENTS

| | | |
|---|---|---|
| 2,013,127 | Bowen | Sept. 3, 1935 |
| 2,557,349 | Howard | June 19, 1951 |
| 2,806,534 | Potts | Sept. 17, 1957 |